United States Patent [19]

France et al.

[11] 4,416,917

[45] Nov. 22, 1983

[54] COATING SUBSTRATES WITH HIGH SOLIDS COMPOSITIONS

[75] Inventors: Haywood G. France, South Charleston; Joseph V. Koleske, Charleston, both of W. Va.

[73] Assignee: Union Carbide Corporation, Danbury, Conn.

[21] Appl. No.: 230,297

[22] Filed: Jan. 30, 1981

[51] Int. Cl.³ .............................................. B05D 3/10
[52] U.S. Cl. ..................................... 427/302; 427/386
[58] Field of Search ............................... 427/302, 386

[56] References Cited

U.S. PATENT DOCUMENTS

| | | | |
|---|---|---|---|
| 2,901,099 | 8/1959 | Krieble | 427/302 |
| 3,218,187 | 11/1965 | Wade | 427/302 |
| 3,411,940 | 11/1968 | Lopez et al. | 427/302 |
| 3,485,655 | 12/1969 | Cole et al. | 427/302 |
| 3,523,032 | 8/1970 | Kujas | 427/302 |
| 3,842,019 | 10/1974 | Kropp | 628/90 |

OTHER PUBLICATIONS

Introductory Data Sheet for L-4368, 3M, Commercial Chemicals Division, May 1978.

*Primary Examiner*—Norman Morgenstern
*Assistant Examiner*—Janyce A. Bell
*Attorney, Agent, or Firm*—Bernard Francis Crowe

[57] ABSTRACT

Various substrates can be coated with cured liquid epoxy resin compositions using a modified two-package system by first painting the substrates with a catalyst having the formula $Sn(CF_3SO_3)_2$ and then contacting the painted substrates with the resin composition. In this scheme considerable time can elapse between preparation of the painted substrates and their contacting of the resin composition.

10 Claims, No Drawings

COATING SUBSTRATES WITH HIGH SOLIDS COMPOSITIONS

BACKGROUND OF THE INVENTION

This invention pertains to a method of coating substrates with aliphatic and cycloaliphatic liquid epoxy resin compositions and particularly to placing a tin salt of trifluoromethanesulfonic acid, as a polymerization catalyst on the substrate.

High solids compositions must contain low molecular weight components in order to impart low viscosity to them. Because of this low molecular weight, these components must be highly active so that they react rapidly during cure and develop physical and mechanical properties rapidly. One of the major disadvantages of high solids coatings, in many instances, is the very limited pot-life due to the highly reactive components. This necessitates a two-package application where complicated metering equipment, mixing valves and controls are required to properly mix the catalysts and coatings intermediates just prior to their application to a suitable substrate. This also limits the application techniques which can be used. However, the advantages of high solids coatings, such as low-energy demand and low solvent emission, make these systems very attractive from both an economical and ecological point of view.

It is an object of this invention to provide a system which eliminates the problem of pot-life.

It is another object to provide a system for preparing high solids curable aliphatic or cycloaliphatic liquid epoxy systems which cure rapidly without sacrificing physical or mechanical properties in the cured product.

Other objects will become apparent to those skilled in the art upon a further reading of the specification.

SUMMARY OF THE INVENTION

In the method of fabricating cured epoxy-coated substrates employing a two-package technique wherein an epoxy resin composition and catalyst are stored separately until use and mixed soon before application to said substrates, an improvement has been discovered which comprises first treating said substrates by adhering thereto a curing amount of a sulfonic acid salt having the formula:

$$M(R_xSO_3)_y$$

wherein $R_x$ is a fluoroalkyl having 1 to about 18 carbons, M is selected from the group consisting of ammonium ($NH_4^+$) cation, quaternary ammonium cations, cations of protonated amines, a mono- or polyvalent cation of a metal selected from the group consisting of metals of Group I to V inclusive and VIII and subgroups VIB and VIIB of the Periodic Table and y is an integer equal to the valence of M, thereafter applying an aliphatic or cycloaliphatic liquid epoxy high solids resin composition containing sufficient amounts of monofunctional carboxylic acids or sufficient amounts of polyols to provide an epoxy/carboxy or epoxy/hydroxy ratio respectively of from about 0.5 to about 5 to said treated substrates and heating the resultant composite at a temperature of about 50°–165° C. until a cured resin coating is obtained.

In the field of solvent coatings, efforts have been made to reduce the amount of volatile solvent present and to increase the amount of reactive components that will react to produce the coatings on the substrate. At a sufficiently high concentration of such components, one has what is known as a high solids coating composition.

DESCRIPTION OF THE INVENTION

The epoxy high solids resin compositions of this invention contain aliphatic or cycloaliphatic liquid epoxy resins well known to those skilled in the art as described fully in U.S. Pat. Nos. 3,027,357, 2,890,194, 2,890,197, 3,117,099, 3,031,434, 3,125,592 and 3,201,360 incorporated herein by reference.

Of particular interest is that portion of U.S. Pat. No. 3,027,357 extending from Column 4, line 11 to Column 7, line 38 and of U.S. Pat. No. 3,201,360 extending from Column 2, line 60 through Column 4, line 43. Among some of the specific illustrative epoxy resins disclosed therein are:

3,4-epoxycyclohexylmethyl-3,4-epoxycyclohexanecarboxylate
bis(3,4-epoxycyclohexylmethyl)adipate
vinyl cyclohexane dioxide
bis(2,3-epoxycyclopentyl)ether
epoxidized linseed oil
epoxidized soybean oil
methyl epoxy linseedate
butyl epoxy soyate
octyl epoxy linseedate
epoxidized polymers and copolymers of butadiene, and the like.

The liquid epoxy resins of this invention contain the epoxy

group. They are thermosetting resins but are not self-curing or self-hardening and must be cured with curing agents or catalysts to effect molding to a hardened state.

The aliphatic and cycloaliphatic liquid epoxy resins are formed by reacting peracetic acid with olefinic esters of cycloaliphatic compounds. Some preferred cycloaliphatic epoxy resins include the following:

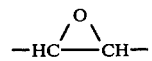

3,4-epoxycyclohexylmethyl 3,4-epoxycyclohexane carboxylate

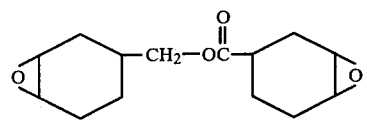

bis(2,3-epoxycyclopentyl) ether

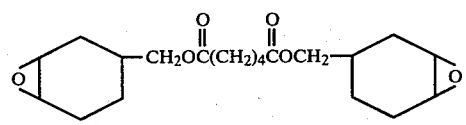

bis(3,4-epoxycyclohexyl methyl) adipate, and

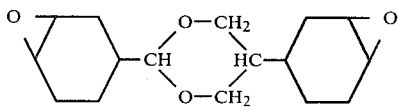

2-(3,4-epoxycyclohexyl-5,5-spiro)-(3,4-epoxy) cyclohexane-m-dioxane.

The term "epoxide equivalent" is defined herein as in Epoxy Resins by H. Lee and K. Neville, page 21, McGraw-Hill Book Co., Inc. NYC (1957), viz., the weight of epoxy resin in grams which contains 1 gram equivalent of epoxy, i.e.,

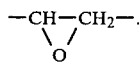

Epoxide equivalents are determined by reacting a known quantity of resin with a known quantity of hydrochloric acid and back-titrating the remaining acid to determine its consumption.

The following tests and definitions were used in evaluating the use of the instant invention.

TESTS

Solvent resistance is a measure of the resistance of the cured film to attack by acetone and is reported as the number of rubs or cycles of acetone soaked material required to remove one-half of a film from the test area. The test is performed by stroking the film with an acetone soaked cheesecloth until that amount of film coating is removed. The number of cycles required to remove this amount of coating is a measure of the coating solvent resistance.

Reverse or face impact measures the ability of a given film to resist rupture from a falling weight. A Gardner Impact Tester using an eight pound dart is used to test the films cast and cured on the steel panel. The dart is raised to a given height in inches and dropped on to the reverse or face side of a coated matal panel. The inches times pounds, designated inch-pound, absorbed by the film without rupturing is a measure of the films reverse or face impact resistance.

Pencil hardness is a measure of film hardness. The adhesion and cohesive strength of the film also influences pencil hardness. Pencils of known lead hardness are shaped to a cylindrical point with a flat tip. The pencils are manually pushed into the coating surface at a 45° angle. Pencil hardness is recorded as the hardest pencil which does not cut the coating.

Crosshatch adhesion—The coated substrate is cut with a series of 10 parallel razor blades ⅛ inch apart in a crosshatch pattern. Adhesion of the coating to the substrate is tested by firmly applying high tack tape and pulling the tape off with a quick pull. The percent coating remaining within the crosshatch pattern is recorded as the crosshatch adhesion.

Spot Test—Five days after the coating is oven cured it is contacted with a caustic solution for 16 hours. Then the panel is washed, dried and rated on a 1 to 10 basis with 10 representing no visible failure and 1 representing complete failure.

Wet Crosshatch Adhesion, Wet Pencil Hardness— Five days after the coating is oven cured the panel is immersed in a 55° C. water bath for 16 hours after which the property is determined.

The high solids epoxy resin composition in addition to aliphatic or cycloaliphatic liquid epoxy resins also contains monofunctional carboxylic acids or polyols. The former are represented by the generic formula:

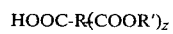

wherein z is an integer having a value of from 0 to 2, preferably 0 or 1; R is an alkyl group having from 6 to 24 carbon atoms, preferably from 12 to 18 carbon atoms when z is 0 and from 1 to 12 carbon atoms, preferably from 2 to 6 carbon atoms, when z is 1 or 2; a cycloalkyl group having 5 or 6 ring carbon atoms; a phenyl group, a naphthyl group or —CH=CH— when z is 1; R' is an alkyl group having from 1 to 8 carbon atoms, preferably 1 to 3 carbon atoms, or a

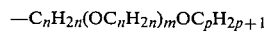

group where n is 2 to 4 and preferably 2; m is 0 to 10 and preferably 2 to 7; and p is 1 to 15.

The most preferred carboxylic acids have a pKa value of less than 4. Illustrative carboxlic acids defined by the generic formula above when z=0 include:
caprylic acid
capric acid
hendacanoic acid
lauric acid
tridecanoic acid
pentadecanoic acid
stearic acid
arachidic acid
behenic acid
cerotic acid
2-ethylhexoic acid
9-methyl-decanoic acid
benzoic acid
naphthoic acid, and the like.

When z is 1 or 2, the monocarboxylic acids are the partial esters (having one free carboxyl group) of di- or tri-carboxylic acids or the anhydrides thereof. Illustrative thereof are the partial esters of: oxalic, malonic, succinic, adipic, suberic, azelaic, sebacic, brassylic, maleic, fumaric, itaconic, phthalic, isophthalic, terephthalic, trimellitic, tartaric, 1,2-cyclo-hexanedicarboxylic, 1,4-cyclohexanedicarboxylic acids, and the like. Alkyl esters are preferred wherein the alkyl contains 1 to about 20 carbons, e.g., methyl, butyl, decyl, lauryl, octadecyl and the like.

Suitable polyols for use in this invention include: alkane diols, triols, and tetraols; aliphatic ether containing diols, triols and tetraols; cycloaliphatic containing diols, triols, and tetraols; aromatic containing diols, triols, and tetraols, and the like. Specific examples of polyols include: ethylene glycol, diethylene glycol, 2,2,4-trimethyl-1,3-pentanediol, propylene glycol, dipropylene glycol, 2,2-dimethyl-1,3-propanediol, polypropylene glycol having an average molecular weight of about 150 to about 600, and having 2 to 4 terminal hydroxyl groups, triethylene glycol, 1,4-cyclohexanedimethanol, 2,2-dimethyl-3-hydroxypropyl 2,2-dimethyl-3-hydroxypropionate, 1,3-butanediol, tetraethylene glycol, 2,2-bis(4-hydroxyphenyl) propane and the ethylene and propylene oxide adducts of 2,2-bis(4-hydroxyphenyl) propane, pentaerythritol, erythritol, glycerine, trimethylol-propane, 1,4-butanediol, 1,6-hexanediol, tripropylene glycol, 2,2-bis(4-hydroxycyclohexyl)propane, 1,2,6-hexanetriol, 1,3-propanediol, and the polycaprolactone ester of a polyol in which from about 1 to about 5, preferably from about 1.5 to about 4.0 moles of caprolactone are esterified with a polyol, such as trimethylol propane or diethylene glycol. Preferably the polycaprolactone ester of a polyol is the polycaprolactone ester of trimethylol propane in which about 1.5 moles of caprolactone are reacted with trimethylol propane or the polycaprolactone ester of trimethylol propane where about 3.6 moles of caprolactone are esterified with trimethylol propane, and the like. Polycaprolactone polyols are described in U.S. Pat. No. 3,169,945, for example. Also ester diols and ester diol alkoxylates produced by the reaction of an ester diol and an alkylene oxide, as described in U.S. Pat. No. 4,163,114, are suitable for use herein.

It is believed, although applicants are not bound by such, that the acids and the polyols initiate polymerization of the epoxy resins by a ring opening step in the presence of the sulfonic acid salt which also propagates said polymerization. Accordingly with monoepoxides the initiation would then take place as represented below:

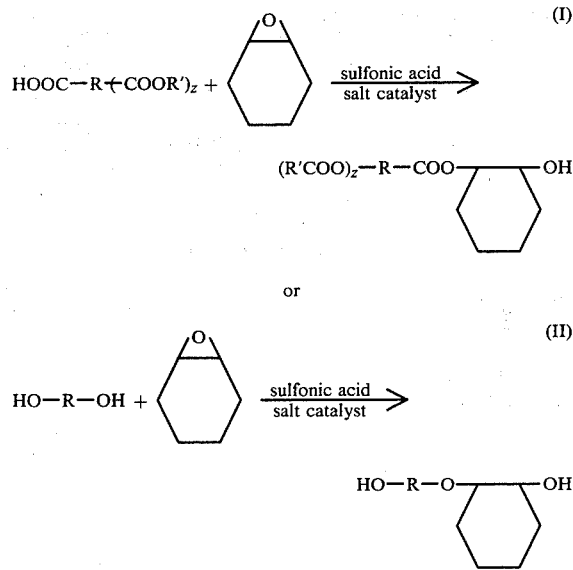

Propagation of I or II with the sulfonic acid salt would be represented as:

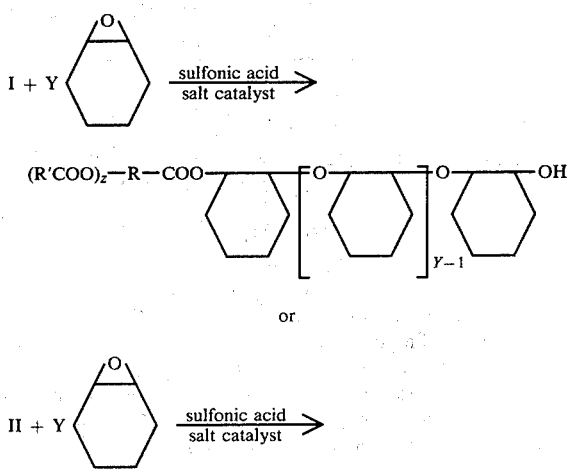

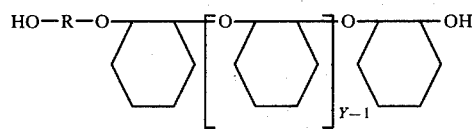

In the case of polyepoxides crosslinking occurs, as is known in the art, by initiation and propagation from more than one epoxy site on the polyepoxide molecule.

The preparation of the sulfonic acid salt catalysts is described in U.S. Pat. No. 3,842,019 incorporated herein by reference.

The preferred curing agent is $Sn(CF_3SO_3)_2$ and is available commercially from the Minnesota Mining and Manufacturing Co. It can be dissolved in various solvents, such as, acetone 50/50 (Vol./Vol.) mixtures of Carbitol (Union Carbide Corporation trademark for monoalkyl ethers of diethylene glycol) and water and the like. This facilitates applying the curing agent to the substrate of choice.

This invention is unique in that it provides a method of catalyst application to the substrate first followed by application of the high solids liquid epoxy composition so that the two streams are not mixed and the pot-life problem is eliminated. The prior art method of curing liquid or solid epoxy resins has normally necessitated intimately mixing the curing agent with the epoxy resin in order to harden the resin. In this invention, the catalyst curing agent and epoxy composition are maintained apart, the catalyst on the substrate and the epoxy composition in a separate mode. They come in contact only when the epoxy composition is coated on the surface of the curing agent. There is no need for mixing of this heterogeneous composite.

The curing agent catalyst can be applied to the substrate as a solution in a suitable catalyst such as ketones, or mixtures of glycol monoethers and water. This catalyst solution can be rolled on, sprayed, painted, or applied by any conventional coating technique known to those skilled in the art. The solution coated substrate can be dried at ambient temperatures or heated if desired to drive off the solvent. The substrate now coated with catalyst can be coated immediately with the liquid epoxy composition or stored and coated with the epoxy at some later time, since the catalyst stays active. In either case, curing of the epoxy system takes place upon application of heat. This provides an unexpected latitude of operation conditions never developed before. Temperatures required for curing extend from a minimum of about 100 to a maximum of about 200° C. A preferred curing temperature will vary depending on the particular liquid epoxy resin used. For example, with BAKELITE® Cycloaliphatic Epoxide ERL-4221, the preferred curing temperature is about 300° F. (150° C.).

The coatings, after curing are solvent resistant and exhibit good physical properties.

Since the method of this invention provides an epoxy coating system which is both very reactive and free of pot-life problems, low molecular weight epoxy resins can be used having low viscosities. In some instances epoxy systems containing 100% solids and yet displaying viscosities of less than 200 cps, as determined by Brookfield RVT viscometer measurements, can be cured with this technique.

The invention is further described in the examples which follow. All parts and percentages are by weight unless otherwise specified.

EXAMPLE 1

A 0.1 percent solution of $Sn(CF_3SO_3)_2$ dissolved in CELLOSOLVE ® Acetate was applied by drawn down to Bonderite 37 cold rolled steel panels with a #60 wire wound rod. These panels were allowed to air dry at room temperature and then coated by drawn down with a mixture of 7.5 grams of ethylene glycol and 37.68 grams of BAKELITE ® Cycloaliphatic Epoxide ERL-4221 (3,4-epoxycyclohexyl methyl-3,4-epoxycyclohexyl carboxylate) (epoxide/hydroxyl ratio of 1.1/1). This panel was baked 5 minutes at 250° F. (120° C.) and gave a slightly tacky coating which, on further heating for 5 minutes at 300° F. (150° C.), produced a hard, glossy coating. The same formulation applied to an untreated panel showed no cure after baking at 300° F. (150° C.).

EXAMPLE 2

A 0.1 percent solution of $Sn(CF_3SO_3)_2$, dissolved in acetone, was applied by draw down to Bonderite 37 cold rolled steel panels and air dried at room temperature. Panels were coated with a formulation consisting of 29.41 grams ethylene glycol, 72.81 grams triethylene glycol, and 150.7 grams of BAKELITE ® Cycloaliphatic epoxide ERL-4221 (epoxide/hydroxyl ratio of 1.1/1) and baked 10 minutes at 300° F. (150° C.). A hard, glossy, clear coating was obtained. This formulation was then applied to treated panels which had been aged for various time periods. The properties on these coatings are listed in the following Table 1.

TABLE 1

| Run No. | Panel Treatment | Treated Panels Aged, days | Cure Cycle Min./°F. | Impact Strength (in-lbs) Reverse | Impact Strength (in-lbs) Face | Pencil Hardness | Passed 100 Acetone Rubs |
|---|---|---|---|---|---|---|---|
| 1 | $Sn(CF_3SO_3)_2$ | Initial (0) | 5/300 | 300 | 300 | 3H | Yes |
| 2 | $SN(CF_3SO_3)_2$ | 1 | 5/300 | 75 | 75 | 4H | Yes |
| 3 | $SN(CF_3SO_3)_2$ | 4 | 5/300 | 25 | 200 | 4H | Yes |
| 4 | $SN(CF_3SO_3)_2$ | 15 | 5/300 | <5 | 35 | 5H | Yes |
| 5 | None | Initial (0) | 5/300 | | | No Cure | |

EXAMPLE 3

Example 2 was repeated using a 75/25 mixture of triethylene glycol/ethylene glycol with BAKELITE ® cycloaliphatic epoxide ERL-4221 (epoxide/hydroxyl ratio of 1.1/1). This formulation was applied to treated Bonderite panels which had been aged for five and nine weeks prior to coating. These coatings were cured 5 minutes at 300° F. (150° C.) and showed pencil hardness of 4H and 5H, respectively. Both coated panels passed 100 acetone rubs; and the coating on the treated panel, aged five weeks, showed reverse impact strength of 50 inch-pounds with face impact strength of 50 inch-pounds while the panel aged nine weeks had reverse and face impact strengths of 175 and 200 inch-pounds, respectively.

EXAMPLE 4

A 100 percent solids coating was formulated with 10.19 grams triethylene glycol, 5.54 grams trimethylolpropane, and 41.45 grams of BAKELITE ® ERL-4221 and was applied to Bonderite 37 steel panels which were previously treated with 0.1 percent solutions of $Sn(CF_3SO_3)_2$ in acetone. These coatings were baked 5 minutes at 300° F. (150° C.). The coatings passed 100 acetone rubs, showed 2H pencil hardness, and had reverse and fact impact strengths of 5 and 50 inch-pounds, respectively.

EXAMPLE 5

Example 4 was repeated using a formulation of 22.62 grams of Caprolactone Polyol A (A polycaprolactone triol having an average molecular weight of 540 and an average hydroxyl number of 310.) and 20.72 grams of BAKELITE ® ERL-4221. The coating cured 15 minutes at 300° F. (150° C.), passed 100 acetone rubs, showed 320 inch-pounds reverse and face impact strength, and had pencil hardness of B.

EXAMPLE 6

Bonderite 37 cold rolled steel panels were treated with 0.1 percent solution of $Sn(CF_3SO_3)_2$ in acetone and with 0.25 percent solution of stannous octoate in acetone. Other panels were untreated. These panels were dried at room temperature and then coated with a mixture of 12.5 grams of Resin A. Resin A is a polycarboxylic acid prepared from ~3 equivalents of phthalic anhydride with 3 equivalents of a 50/50 mixture of Caprolactone Polyol A and Caprolactone Polyol B (A polycaprolactone polyol having an average molecular weight of 300 and an average hydroxyl number of 560.) and 15.2 grams of BAKELITE ® Cycloaliphatic epoxide ERL-4221 (epoxy/carboxyl ratio of 3.3). The panels were placed in a forced draft oven for 20 minutes at 350° F. (175° C.). All coatings were hard and glossy, but only the panels treated with $Sn(CF_3SO_3)_2$ produced cured coatings with good solvent resistance, as seen in Table 2.

TABLE 2

| Run No. | Catalyst Treatment | 100 Acetone Rubs | Impact Strength (in-lbs) Reverse | Impact Strength (in-lbs) Face | Pencil Hardness |
|---|---|---|---|---|---|
| 1 | $Sn(CF_3SO_3)_2$ | Passed | <5 | 50 | 2H |
| 2 | Stannous Octoate | Failed | 15 | 50 | 2H |
| 3 | None | Passed | <5 | 5 | HB |

EXAMPLE 7

A panel that had been treated with catalyst $Sn(CF_3SO_3)_2$ and stored under ambient conditions for about 5.5 months had the Example 3 formulation applied to it. The coated panel was then cured for 5 minutes at 300° F. (150° C.) in a forced air oven. After cooling to room temperature, the coating had the following properties—Hardness-5H, Acetone Rubs-100, Reverse Impact-25 in-lbs., Face impact-50 in-lbs.

EXAMPLES 8–12

When the procedure described in Example 1 is repeated with the exception that caprylic, lauric, stearic, arachidic or benzoic acids are substituted for the ethylene glycol, a comparable cured epoxy coating is obtained.

EXAMPLES 13–16

When the procedure described in Example 2 is repeated with the exception that monomethyl maleate, monodecyl sebacate, or monooctadecyl phthalate are substituted for the ethylene glycol and monomethyl isophthalate, monobutyl itaconate or monolauryl adipate for the triethylene glycol, a comparable cured epoxy coating is obtained.

MODIFICATIONS

These examples are made with specific hydroxy and epoxy compounds. Other materials suitable in this reaction are hydroxyl compounds such as polyether and polyester polyols, 1,4-butanediol, 1,3-propanediol, 1,6-hexanediol, Bisphenol A, diethylene glycol, polymeric polyols such as styrene/allyl alcohol, and acrylic polyols, and others as well as carboxyl compounds such as liquid polycarboxylic acids, acrylic polymers containing carboxyl groups, and others reacted with various epoxy derivatives such as cycloaliphatic epoxides, aliphatic epoxides, and glycidyl-type epoxides. Catalyst concentration can be varied to increase or decrease reaction rate, and bake temperatures and cycles can be increased or decreased to control rate of cure.

Although the invention has been described in its preferred forms with a certain degree of particularity, it is understood that the present disclosure has been made only by way of example and that numerous changes can be made without departing from the spirit and the scope of the invention.

What is claimed is:

1. In the method of fabricating cured epoxy-coated substrates employing a two-package technique wherein an epoxy resin composition and catalyst are stored separately until use and mixed soon before application to said substrates, the improvement which comprises first treating said substrates by adhering thereto a curing amount of a sulfonic acid salt having the formula:

$$M(R_xSO_3)_y$$

wherein $R_x$ is a fluoroalkyl having 1 to about 18 carbons, M is selected from the group consisting of ammonium ($NH_4^+$) cation, quaternary ammonium cations, cations of protonated amines, a mono- or polyvalent cation of a metal selected from the group consisting of metals of Groups I to V inclusive and VIII and subgroups VIB and VIIB of the Periodic Table and y is an integer equal to the valence of M, thereafter applying an aliphatic or cycloaliphatic liquid epoxy high solids resin composition, containing sufficient amounts of monofunctional carboxylic acids or sufficient amounts of polyols to provide an epoxy/carboxy or epoxy/hydroxy ratio respectively of from about 0.5 to about 5, to said treated substrates and heating the resultant composite at a temperature of about 50° to about 200° C. until a cured resin coating is obtained.

2. Method claimed in claim 1 wherein the sulfonic acid salt has the formula:

$$Sn(CF_3SO_3)_2$$

3. Method claimed in claim 1 wherein the aliphatic liquid epoxy resin is epoxidized linseed oil.

4. Method claimed in claim 1 wherein the cycloaliphatic liquid epoxy resin is 3,4-epoxycyclohexylmethyl-3,4-epoxycyclohexane carboxylate.

5. Method claimed in claim 1 wherein the monofunctional carboxylic acid is lauric acid.

6. Method claimed in claim 1 wherein the monofunctional carboxylic acid is a mixture of monodecyl sebacate and monomethyl isophthalate.

7. Method claimed in claim 1 wherein the polyol is ethylene glycol.

8. Method claimed in claim 1 wherein the polyol is a mixture of ethylene glycol and triethylene glycol.

9. Method claimed in claim 1 wherein the curing reaction is effected at a temperature in the range of about 100° to about 165° C.

10. Method claimed in claim 1 wherein the sulfonic acid salt treated substrate is stored before contacting with the liquid epoxy resin composition.

* * * * *